United States Patent [19]

Toukola

[11] Patent Number: 5,581,139
[45] Date of Patent: Dec. 3, 1996

[54] MAGNETIC HYSTERESIS CLUTCH

[75] Inventor: Risto Toukola, Nova Milanese, Italy

[73] Assignee: Ipalco B.V., Netherlands

[21] Appl. No.: 296,549

[22] Filed: Aug. 25, 1994

[30] Foreign Application Priority Data

Aug. 25, 1993 [LU] Luxembourg ............................ 88 395

[51] Int. Cl.⁶ .......................... H02K 49/04; H02K 15/00
[52] U.S. Cl. .................... 310/105; 310/78; 310/92
[58] Field of Search .............................. 310/103, 105, 310/78, 92

[56] References Cited

U.S. PATENT DOCUMENTS

| | | | |
|---|---|---|---|
| 2,683,825 | 7/1954 | Georgeff | 310/96 |
| 3,700,941 | 10/1972 | Duncan | 310/105 |
| 3,848,852 | 11/1974 | Therkildsen | 254/187 R |
| 3,915,433 | 10/1975 | Therkildsen | 254/187 R |
| 4,227,680 | 10/1980 | Hrescak | 254/344 |
| 4,777,397 | 10/1988 | Parshall | 310/156 |
| 4,876,471 | 10/1989 | Lacour | 310/105 |
| 4,998,052 | 3/1991 | Erdman et al. | 318/701 |
| 5,204,572 | 4/1993 | Ferreira | 310/156 |

*Primary Examiner*—Thomas M. Dougherty
*Assistant Examiner*—Jonathan Link
*Attorney, Agent, or Firm*—Fishman, Dionne & Cantor

[57] ABSTRACT

A magnetic hysteresis clutch comprises an external rotor and a rotary magnetic inductor arranged in said external rotor so as to define a radial air gap. Rings of ferromagnetic hysteresis material are mounted in said external rotor so as to be able to undergo a reversible thermal expansion of their internal diameter leading to an increase in the radial air gap. The clutch is designed so that the heating up of the ferromagnetic material in the rings which accompanies an increase of the slip between the external rotor and the rotary magnetic inductor, produces a reversible increase in the radial air gap which is sufficient to decrease the transmitted torque. Thus it is possible to provide a magnetic hysteresis clutch in which the transmitted torque reversibly decreases when the slip increases.

11 Claims, 2 Drawing Sheets

MAGNETIC HYSTERESIS CLUTCH

BACKGROUND OF THE INVENTION

1. Field of the Invention

The present invention relates to a magnetic hysteresis clutch or coupling device.

More particularly, it relates to a magnetic hysteresis clutch comprising an external rotor supporting a ferromagnetic hysteresis material and a rotary magnetic inductor arranged in the external rotor so as to define a radial air gap delimited on the outside by the ferromagnetic hysteresis material. The slip between the magnetic inductor and the ferromagnetic hysteresis material is varying between a minimum value (V1) and a maximum value (V2). The coupling between the magnetic inductor and the magnetic armature takes place by magnetization and demagnetization of the ferromagnetic hysteresis material which is in relative rotation with respect to the magnetic field.

These magnetic hysteresis clutches are used to transmit a torque from an input shaft of the clutch to an output shaft of the clutch in the case where there are significant differences between the speed of rotation of the input shaft and the speed of rotation of the output shaft of the clutch. A typical application of these magnetic hysteresis clutches is found in a reeling-in/reeling-out device delivering a reeling-in torque and a braking torque during reeling-out. In such a device, the input shaft of the clutch is coupled to the drive motor which has a nearly constant speed of rotation. The output shaft of the clutch is coupled to a reeling-in/reeling-out drum. The speed of rotation of the reeling-in/reeling-out drum passes through zero and changes direction, whereas the speed of rotation of the motor is substantially constant. If the modulus of the maximum speed of rotation of the output shaft of the clutch represents 50% of the modulus of the speed of rotation of the input shaft of the clutch, both during the reeling-out operation and during the reeling-in operation, the slip between the magnetic inductor and the magnetic armature of the clutch increases by 200% between the reeling-in operation and the reeling-out operation. This is because, during the reeling-in operation, the output shaft of the clutch rotates in the same direction as the input shaft, whereas, during the reeling-out operation, the output shaft of the clutch rotates in the opposite direction to that of the input shaft.

2. Prior Art

In a conventional magnetic hysteresis clutch, the torque transmitted increases with the slip between the magnetic inductor and the magnetic armature. This phenomenon is due to the fact that the magnetic field rotating with respect to the magnetic armature generates eddy currents in the latter which increase the coupling between the magnetic inductor and the magnetic armature. From patent application DE-A-2,139,009 it is known to amplify this phenomenon by fitting the magnetic armature with an element which is a good electrical conductor. This element is applied over the ferromagnetic material of the rotor. The transmitted torque of the magnetic clutch thus obtained strongly increases when the slip between the magnetic inductor and the magnetic armature increases.

European patent EP-A-0,269,535 discloses a magnetic hysteresis clutch wherein the transmitted torque increases only slightly with the slip between the magnetic armature and the magnetic inductor. In this clutch a ferromagnetic hysteresis material which is a poor electrical conductor is used for the magnetic inductor, thus leading to a decrease of eddy currents. More precisely, the ferromagnetic hysteresis material is a molded composite paste comprising a matrix based on a resin in which particles of a hysteresis magnetic material are dispersed. The working temperature of this composite material must be limited to 100° C. so as to prevent its destruction.

For some applications it is however recommended to have a clutch with a negative characteristic curve, that is a clutch wherein the transmitted torque decreases when the slip increases.

SUMMARY OF THE INVENTION

The above-discussed and other drawbacks and deficiencies of the prior art are overcome or alleviated by the magnetic hysteresis clutch of the invention.

The object of the present invention is to provide such a clutch in which the transmitted torque reversibly decreases when the slip increases.

This object is achieved by a magnetic hysteresis clutch in which the ferromagnetic hysteresis material forms at least one ring which is mounted in said external rotor so as to be able to undergo a reversible thermal expansion of its internal diameter leading to an increase in said radial air gap. Furthermore, the clutch is designed so that the heating up of the ferromagnetic material, which accompanies an increase of the slip, produces an increase in said radial air gap which is sufficient to reversibly decrease the transmitted torque.

The main advantage of the invention is that magnetic hysteresis clutches—which are sturdy, reliable and relatively inexpensive clutches—can now be used in applications in which it is recommended to have a "negative characteristic" of the clutch (that is to say a decrease in the transmitted torque when the slip increases). Indeed, the new clutch makes it not only possible to compensate for the influence of possible eddy currents on the coupling between the rotary magnetic inductor and the rotor supporting the ferromagnetic hysteresis material, but also to have a reversible decrease in the transmitted torque when the slip between the rotor and the magnetic inductor increases. Such a "negative characteristic" could until now be obtained only with electromagnetic clutches fitted with systems for regulating the supply current, which are both complicated and expensive.

It is known that the energy dissipated in the ferromagnetic hysteresis material is substantially proportional to the frequency with which the magnetic field varies polarity. In other words, the temperature of the ferromagnetic hysteresis material is substantially proportional to the slip between the magnetic inductor and the ferromagnetic hysteresis material. The working temperature of the ferromagnetic hysteresis material consequently increases from a temperature t1 to a temperature t2 if the slip increases from V1 to V2. In the magnetic hysteresis clutch according to the invention the internal diameter of the ferromagnetic hysteresis ring increases with temperature, leading to a reversible increase of the radial air gap from e1 to e2. Knowing that the transmitted torque is inversely proportional to the cube of the radial extension of the air gap, it results that already a very small increase of the air gap produces an important reduction of the transmitted torque.

To obtain the desired in torque it is necessary to carry out an adequate positioning of the working temperatures $t_1$ and $t_2$ in the working range of the ferromagnetic hysteresis material. This positioning can be achieved by acting on a large number of parameters such as, for example: the geometry and the dimensions of the ferromagnetic material, the intensity of its cooling, the strength of the magnetic field, the number of polarity reversals of the magnetic field around the magnetic inductor, the thickness of the air gap, etc. Furthermore, the thermal inertia of the clutch should be as low as possible, in order to allow a quick warming up and cooling down of the ferromagnetic material. The influence of the various parameters on the clutch design is either controlled experimentally or with the aid of a computerized model of the clutch.

A radial air gap clutch has many advantages over an axial air gap clutch. In this context, it is important to note that magnetic hysteresis clutches with a radial air gap are hardly known in the state of the art. It will consequently be appreciated that precious technical teachings in the field of magnetic clutches with radial air gap are added to the state of the art.

The ferromagnetic material is preferably a material with a high resistivity. In this way, the eddy currents which are generated in the ferromagnetic material are of low strength. This results in having to compensate for only a very small increase in the transmitted torque when increasing the slip. Thereafter, a smaller temperature rise in the region of the ferromagnetic material is sufficient to obtain the desired decrease in the transmitted torque.

Excellent results have been obtained by using as ferromagnetic material a sintered material which is based on electrically insulated ferromagnetic metal powers. It will be appreciated that these sintered materials have superior magnetic properties and a higher working temperature than the composite materials comprising ferromagnetic particles dispersed in a resin.

The radial air gap clutch according to the invention advantageously comprises a magnetic inductor consisting of a plurality of wheels mounted on a shaft, each of these wheels supporting a plurality of permanent magnets on a peripheral radial ring. This embodiment enables, inter alia, to increase the possibilities of adaptation and adjustment of the clutch by varying the number of inductor wheels used.

The ferromagnetic hysteresis material of the rotor is in this case advantageously distributed over a plurality of rings which are axially separated from each other. Each of these rings surrounds one of the wheels thereby defining a radial air gap with the latter. This embodiment makes it possible, by virtue of the small mass of the individual rings, to achieve a better control of the temperature variation to which the ferromagnetic material is subjected. An optimum controlled cooling of the rotor supporting these ferromagnetic rings is achieved by longitudinal rotor cooling fins.

In a preferred embodiment of the invention, the radial overlapping between some or all of the magnetic inductor wheels and the corresponding ferromagnetic rings may be adjusted by changing their axial alignment. This feature allows fine adjustment of the transmitted torque.

Preferably each of the wheels of the magnetic inductor supports a large number of small magnets having a pole surface area on the order of a few tens of square millimeters. only. As a result, it is possible to fine tune the magnetic field to the design criteria of the clutch (e.g.: magnetic field strength, number of magnetic polarity reversals per ring).

It will be noted that the clutch is advantageously designed so that heating up of its permanent magnets in the continuous operation mode is accompanied by parallel heating up of the wheels supporting these permanent magnets; the wheels being designed so that the resulting increase in their diameter automatically compensates, by a reduction in the air gap, for a decrease in the magnetic field produced by the permanent magnets. As a result, heating of the clutch during continuous operation does affect, or only slightly affects, the value of the transmitted torque.

The present invention also provides a reeling-in/reeling-out device (respectively a winding/unwinding device) comprising a drive motor and a reeling-in/reeling-out drum (respectively a winding/unwinding drum). This device is characterized by a magnetic hysteresis clutch according to the invention. The magnetic inductor of this clutch is coupled to the reeling-in/reeling-out drum and the rotor supporting the ferromagnetic hysteresis material is coupled to the drive motor. This device is advantageously distinguished by the fact that the reeling-in torque is higher than the braking torque developed during the reeling-out operation. The coupling to the drive motor of the rotor supporting the ferromagnetic hysteresis material provides optimum constant cooling of the ferromagnetic hysteresis material, because the rotor thus has a high and nearly-constant speed of rotation.

This reeling-in/reeling-out device is advantageously fitted with a speed reducer or step-down gear connected between the rotor and the reeling-in/reeling-out drum. The purpose of this speed reducer is to decrease both the maximum slip, during the reeling-out operation, and the variation in the slip between the reeling-in operation and the reeling-out operation. It will be appreciated that, with a clutch according to the present invention, the reduction ratio of this speed reducer can be decreased, given that an increase in the slip no longer leads to an increase in the transmitted torque. In addition, it will be shown that the effect of the efficiency of the speed reducer on the characteristic of the reeling-in/reeling-out device is compensated for by the negative characteristic of the clutch.

However, it remains to be noted that the use of a clutch according to the invention is not limited to a reeling-in/reeling-out, respectively winding/unwinding device. Its properties, and in particular its "negative characteristic", will be appreciated in many other uses.

Other advantages and characteristics of the present invention will result from the detailed description of a typical application and of preferred embodiments, based on the attached FIGURES.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE PREFERRED EMBODIMENTS

Figure 1:
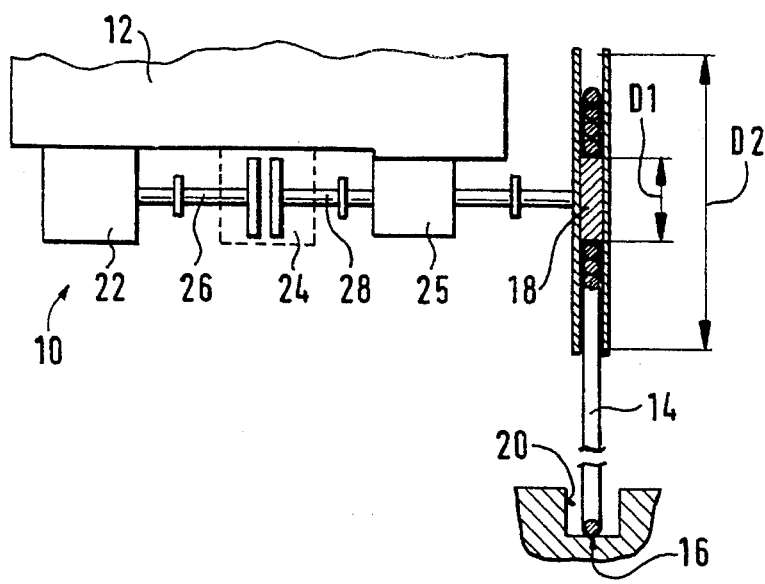
FIG. 1 is a diagrammatic view of a reeling-in/reeling-out device for an electrical power cable equipping a gantry crane.

In order to make things clearer and easier to understand, a description will first be given, by way of illustration, of an example of a typical application of a clutch according to the invention. FIG. 1 is a diagrammatic representation of a reeling-in/reeling-out device 10 equipping a gantry or tower crane 12. The function of this reeling-in/reeling-out device 10 is to reel-in, or alternatively reel-out, an electrical power cable 14 during the movement of the gantry crane on a rolling track between two opposite end positions. One end of the cable 14 is attached to the ground at a fixed point 16, most often in a median position between the two end positions. The other end of the cable 14 is wound onto a reeling-in/reeling-out drum 18, attached to the movable gantry crane 12. The reference 20 represents a channel in the ground in which the cable 14 is laid as it is unwound from the reeling-in/reeling-out drum 18. The reeling-in/reeling-out device 10 comprises, outside the reeling-in/reeling-out drum 18, a drive motor 22, a magnetic hysteresis clutch 24 and, most often, a speed reducer 25. The motor 22, most often an asynchronous three-phase motor rotating, for example, at a speed of 1440 rpm, is coupled to an input shaft 26 of the magnetic hysteresis clutch 24. An output shaft 28 of the latter is coupled via the speed reducer 25 to the reeling-in/reeling-out drum 18.

As the gantry crane 12 moves from its median position in the direction of one of its two end positions, the cable 14 is unwound by the reeling-in/reeling-out drum 18 in order to be laid in the channel 20. The reeling-in/reeling-out device 10 must produce during this operation a braking torque which keeps the cable 14 under tension as it is unwound. It will be noted that the direction of rotation of the reeling-in/reeling-out drum 18 is opposite that of the motor 22 during the reeling-out operation.

As the gantry crane 12 returns towards its median position, the cable 14 is wound onto the reeling-in/reeling-out drum 18. The reeling-in/reeling-out device 10 must now produce a working torque sufficient to remove the cable 14 from its channel 16, to lift it up and to wind it onto the reeling-in/reeling-out drum 18. It will be noted that the direction of rotation of the reeling-in/reeling-out drum 18 is the same as that of the motor 22 during the reeling-in operation.

When the gantry crane 12 has stopped moving, the reeling-in/reeling-out device 10 must also supply a torque for braking the reeling-in/reeling-out drum 18 in order to keep the cable 14 under tension. It will be noted that the reeling-in/reeling-out drum 18 has stopped rotating whereas the motor 22 still rotates at its nominal speed of for example 1440 rpm.

Figure 2:
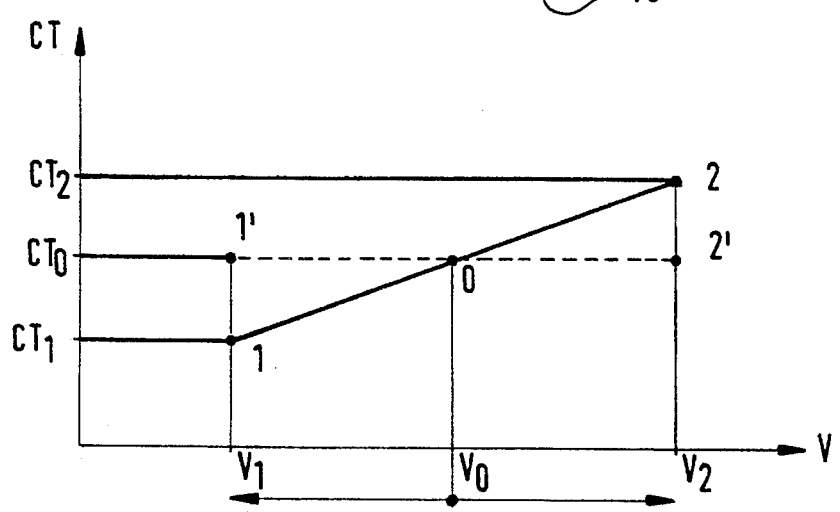
FIG. 2 is a diagram representing the dependence of the transmitted torque on the slip, for a magnetic hysteresis clutch according to the state of the art.

FIG. 2 represents graphically the behavior of a magnetic hysteresis clutch 24, according to the state of the art, in the reeling-in/reeling-out device 10 of FIG. 1. The abscissa represents the slip (i.e. the relative velocity) between the magnetic inductor and the magnetic armature of such a clutch 24 and the ordinate represents the torque at the output of the clutch 24. The slip $V_o$ corresponds to the case where the output shaft 28 has stopped moving, while the motor 22 still rotates at its nominal speed. This is the situation in which the gantry crane 12 has stopped moving. Rates of slip below $V_o$ correspond to situations in which the output shaft 28 rotates in the same direction as the motor 22. This is the case for the reeling-in of the cable 14. Rates of slip above $V_o$ correspond to situations in which the output shaft 28 rotates in the opposite direction to that of the motor 22. This is the case for the reeling-out of the cable 14.

The curve (1', 2') represents the theoretical characteristic curve of the magnetic hysteresis clutch. The torque transmitted between the magnetic inductor and the magnetic armature is independent of the slip between the two. However, in practice it is found that the torque transmitted between the magnetic inductor and the magnetic armature increases with the slip (cf. curve (1, 2)). This phenomenon is due to the fact that the magnetic inductor rotating relatively with respect to the magnetic armature naturally creates, in the ferromagnetic hysteresis material of the magnetic armature, eddy currents which increase the coupling between the magnetic armature and the magnetic inductor. In FIG. 2 it may be seen that the torque $CT_1$, transmitted during the reeling-in of the cable 14, is far less important than the torque $CT_2$ transmitted during the reeling-out of the cable 14.

Let T(MIN) be the minimum traction force to be applied, at the reeling-in/reeling-out drum 18, to the cable 14 in order to withdraw it from the channel 20, to bring it back up and to wind it onto the reeling-in/reeling-out drum 18. The minimum torque needed by the output shaft 28 of the clutch 24 necessary to produce T(MIN) thus equals:

$$CT_1 = (D_2/2) * T(MIN) * (r/n) \quad (1)$$

where:

D2 is the external diameter of the reeling-in/reeling-out drum 18;

n is the efficiency of the speed reducer 25;

r is the reduction ratio of the speed reducer 25.

The traction force applied to the cable 14 at the reeling-in/reeling-out drum 18 reaches a maximum when the operation of reeling-in the cable 14 approaches its end, that is to say when the speed between the magnetic inductor and the magnetic armature is at a maximum. Expressed as a function of the braking torque $CT_2$ at the output shaft 28 of the clutch 24, this traction force is given by:

$$T(MAX) = (2/D_1) * CT_2 * (1/r) * (1/n) \quad (2)$$

where:

$D_1$ is the internal diameter of the reeling-in/reeling-out drum 18;

From (1) and (2) we may thus obtain:

$$T(MAX) = (D_2/D_1) * (CT_2/CT_1) * (1/n^2) * T(MIN) \quad (3)$$

In this equation (3), we may assume, for example, that $(D_2/D_1) = 3$; n=0.9; giving:

$$T(MAX) = 3.7 * (CT_2/CT_1) * T(MIN) \quad (4)$$

Without any precautions to prevent eddy currents in the ferromagnetic hysteresis material, the behavior is described by the curve (1, 2) of FIG. 2. $CT_2$ is approximately 100% greater than $CT_1$, that is to say that T(MAX) is approximately 7.4 times greater than T(MIN).

By taking suitable precautions to prevent eddy currents in the ferromagnetic hysteresis material, it is of course possible that the behavior of the prior art clutch approaches that described by the theoretical curve (1', 2') in the diagram of FIG. 2. But even in this case, where $CT_1$ is substantially equal to $CT_2$, T(MAX) still remains 3.7 times greater than T(MIN).

From the functional point of view of the reeling-in/reeling-out device 10, there is however no reason to have a traction force greater than T(MIN). But, while mechanically designing the cable, it is necessary, of course, to take into account T(MAX) and not T(MIN), which leads to an appreciable mechanical overdesigning of the cable 14.

Figure 4:
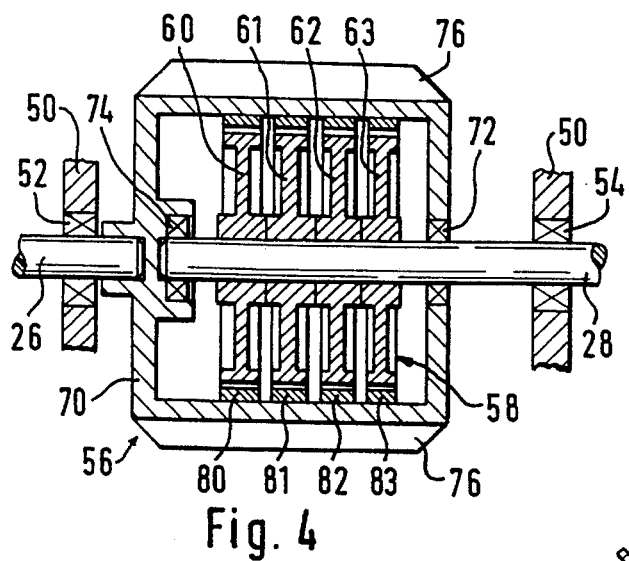
FIG. 4 is a longitudinal cross-section of a preferred embodiment of a magnetic hysteresis clutch according to the invention.

FIGS. 4 to 7 represent constructional details of a first embodiment of a magnetic hysteresis clutch according to the invention. FIG. 4 shows that the input shaft 26 and the output shaft 28 are supported in a coaxial manner in a frame 50, for example by means of rolling bearings 52 and 54. The input shaft 26 is rigidly attached to a magnetic armature 56, while the output shaft 28 is rigidly attached to a magnetic inductor 58.

The magnetic inductor 58 comprises a plurality of wheels 60, 61, 62, 63 all rigidly attached to the output shaft 28 so as to be able to transmit a torque to the latter. Each of these wheels 60, 61, 62, 63 is fitted with a peripheral ring 64 (cf. FIG. 6) which supports permanent magnets 66 creating a magnetic field. Instead of using a relatively small number of permanent magnets with large pole surface area (for example AlNiCo magnets), it has been found advantageous to use a large number of small permanent magnets with high magnetic density having small pole surface areas (for example of the order of 50 to 100 mm$^2$). It will be noted that each wheel of the magnetic inductor 58 can, for example, include more than one hundred small permanent magnets 66. In FIG. 7, which shows a view of the peripheral ring 64 of a wheel 60 of the magnetic inductor, it may be seen that the permanent magnets 66 have the shape of cylindrical pills which are simply inserted into blind bores 68 made in the peripheral ring 64. The permanent magnets "pills" 66 are held in place in these blind bores 68 by magnetic attraction.

The juxtaposition of a large number of permanent magnets 66 of small pole surface area makes it possible—by varying for example the polarity of the pole surface areas oriented outwards and the strength of the individual magnets and their arrangement on the peripheral ring 64—to finely modulate the magnetic field created around a wheel 60 of the magnetic inductor 58. Thus, the person skilled in the art will appreciate having at his disposal an easy means of optimizing the magnetic field.

The magnetic armature 56 comprises an external rotor 70 which surrounds the magnetic inductor 58. This external rotor 70 is rigidly attached to one side of the input shaft 26 so as to be able to receive a torque from the latter. On the axially opposite side, the external rotor 70 bears, advantageously through a rolling bearing 72, on the output shaft 28. Moreover, the latter is advantageously supported with its free end in a rolling bearing 74 integrated, on the side facing the input shaft 26, into the external rotor 70. Fins 76 extend axially along the external peripheral surface of the external rotor 70, effectively cooling the latter (cf. FIG. 5).

The external rotor 70 serves to support the ferromagnetic hysteresis material. The latter surrounds, annularly, the peripheral rings 64 of the wheels 60, 61, 62, 63 of the magnetic inductor 58 so as to define, with respect to the permanent magnets 66, a radial clearance or air gap 78 (cf. FIG. 6). By way of illustration it will be noted that this radial clearance 78 may, for example, measure a few tenths of a millimeter.

Figure 6:
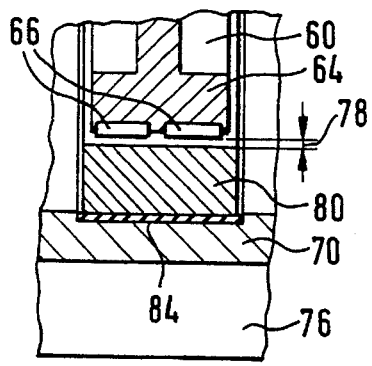
FIG. 6 is a detail of the longitudinal cross-section of the clutch of FIG. 4.
Figure 5:
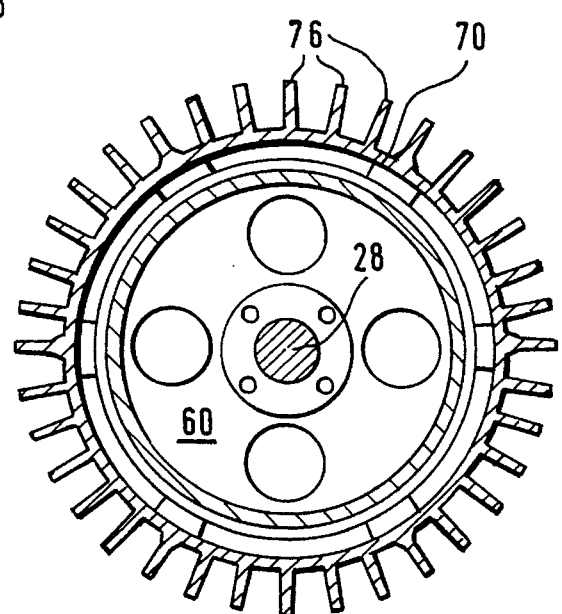
FIG. 5 is a transverse cross-section through the same clutch as that of FIG. 4.
Figure 7:
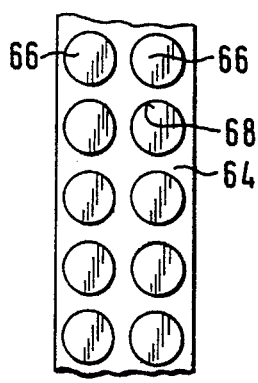
FIG. 7 is a detail view of a magnetic inductor wheel of the clutch of FIG. 4.

In the embodiment represented in FIGS. 4 and 6, each wheel 60, 61, 62, 63 of the magnetic inductor is associated with a separate ring 80, 81, 82, 83 made of ferromagnetic hysteresis material. Each of these rings 80, 81, 82, 83 is, for example, housed in a groove 84 of the inner wall of the external rotor 70. An elastic material 85, for example silicone provides the adhesion between the outer wall of the ring 80 and the inner wall of the external rotor 70, while at the same time allowing reversible thermal expansion of the ring 80 (cf. FIG. 6). However, the rings 80, 81, 82, 83 could also be fixed by mechanical means, for example by screws. Radial-spacing elastic pieces, for example elements made of elastomeric material, allow in this case their reversible thermal expansion. It will also be noted that the rings 80, 81, 82, 83 can be rings made in a single piece of a ferromagnetic hysteresis material or rings made of a plurality of ring segments made of ferromagnetic hysteresis material which are then fixed to the inside of a second ring, made of a material which is not necessarily ferromagnetic. This second ring is then heated up by the segments made of ferromagnetic hysteresis material and expands diametrically in order to produce the increase in the radial air gap which leads to desired decrease in the transmitted torque.

The ferromagnetic hysteresis material used is preferably a sintered material constituted from metal oxide (for example Fe203) powders which are electrically insulated. The material thus obtained has a high isotropic electrical resistance which effectively prevents the generation of eddy currents in the magnetic armature. In addition, its magnetic properties are excellent and its working temperature is relatively high. However, in order to obtain a similar result, it would be also possible to use a finely laminated material in which sheets made of ferromagnetic hysteresis material are separated from each other by a dielectric film.

An important feature of the proposed magnetic clutch resides in its construction. The variable magnetic field, induced in the ferromagnetic hysteresis material, produces therein an amount of thermal energy that is proportional to the frequency with which the magnetic field varies, and therefore proportional to the slip between the magnetic inductor 58 and the magnetic armature 56. The more the slip increases, the more the thermal energy released in the ferromagnetic hysteresis material increases. A heating up of the latter produces an internal diameter increase of the rings 80, 81, 82, 83, so that the radial air gap 78 increases. In accordance with the present invention the clutch is designed so that the heating up of the ferromagnetic hysteresis material produces, when passing from the minimum slip (V1) to the maximum slip (V2), the increase in the radial gap which is necessary to produce the desired decrease in the transmitted torque. It will be noted that the radial expansion for this purpose is very low, since the transmitted torque is inversely proportional to the cube of the radial extension of the air gap between the magnets 66 and the rings 80, 81, 82, 83.

In order to achieve this design of the clutch, it is possible, for example, to vary one or more of the following parameters: the physical characteristics of the ferromagnetic hysteresis material (thermal expansion, thermal conductivity, density, etc.); the mass, thickness and internal diameter of the rings 80, 81, 82, 83; the heat transfer between the rings 80, 81, 82, 83 and the external rotor 70 (possibly use of a thermal insulation between the two); the design of the external rotor 70 (materials, dimensions of the fins 76, etc.); the drive speed of the external rotor 70; the radial dimension of the air gap 78; the strength of the field produced by the permanent magnets 66; the number of reversals of the polarity of the magnetic field surrounding each wheel 60, 61, 62, 63 of the magnetic inductor 58; etc.

Figure 3:
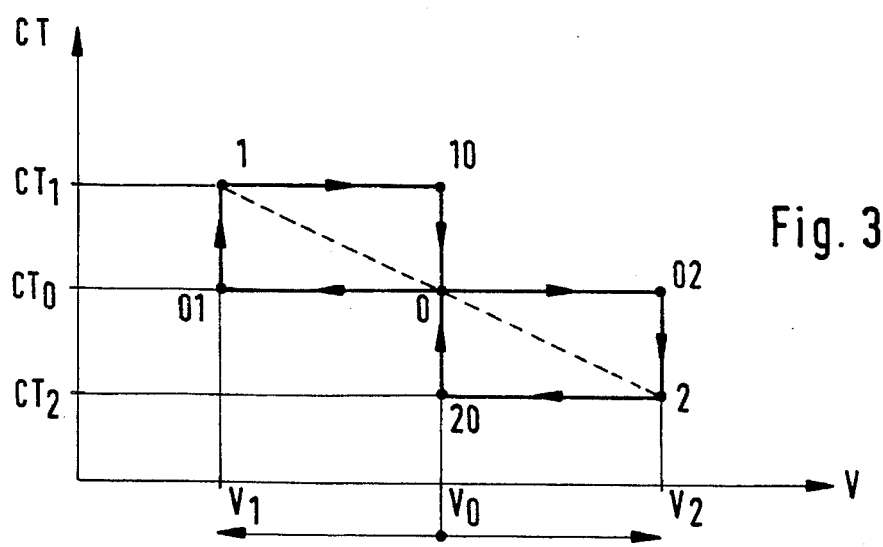
FIG. 3 is a diagram similar to FIG. 2 representing the typical dependence of the transmitted torque on the slip for a magnetic hysteresis clutch according to the invention.

FIG. 3 represents graphically, in a diagram similar to that of FIG. 2, the behavior of a magnetic clutch according to the invention in the reeling-in/reeling-out device of FIG. 1. When the gantry crane 12 has stopped moving, the slip between the magnetic inductor 58 and the armature 56 is equal to V0 and the braking torque equals CT0. This situation corresponds to the point 0 in the diagram and the operating temperature of the ferromagnetic hysteresis material is t0. If the cable 14 is unwound, the slip increases from V0 to V2. The braking torque remains constant, at least initially, since there are no eddy currents generated in the ferromagnetic hysteresis material. The operating point moves from the point 0 towards the point 02. However, the increase in the slip from V0 to V2 causes the ferromagnetic hysteresis material to heat up from the temperature t0 to the temperature t2. As a result of this heating up the radial air gap increases from e0 to e2, which manifests itself in a decrease in the braking torque from CT0 to CT2, that is to say by passing in the diagram of FIG. 3 from the point 02 towards the point 2. If the elements made of ferromagnetic hysteresis materials have a relatively small mass, as is the case in the clutch of FIGS. 4 to 7, the passage of their operating temperature t0 to the temperature t2 takes place rapidly and requires barely more than a few tens of seconds (typically 20 seconds in a prototype clutch).

If the gantry crane 14 is stopped, the slip decreases from V2 to V0, that is to say the operating point passes from the point 2 to the point 20. At the same time, the losses, due to hysteresis, in the magnetic armature decrease and the operating temperature of the ferromagnetic hysteresis material falls from t2 towards t0. This results in an decrease in the radial air gap from e2 to e0 and, consequently, an increase in the braking torque from CT2 to CT0, thus returning to the starting point 0 in the diagram of FIG. 3.

If the cable 14 is being wound, the slip decreases from V0 to V1. The reeling-in torque developed at the output of the magnetic clutch remains constant, at least during the first few seconds, since there are no eddy currents generated in the ferromagnetic hysteresis material. The operating point moves from the point 0 towards the point 01. However, the decrease in the slip from V0 to V1 causes a decrease in the energy released by the hysteresis effect in the ferromagnetic hysteresis material. This results in a rapid decrease in the operating temperature of the latter from T0 to t1, hence a decrease in the radial air gap from e0 to e1 and, consequently, an increase in the torque developed at the output of the magnetic clutch 24 from CT0 to CT1. In the diagram of FIG. 3, this corresponds to passing from the point 01 to the point 1.

If the gantry crane 14 is stopped, the slip increases once again from V1 to V0, that is to say the operating point passes from the point 1 to the point 10. At the same time, the losses, due to hysteresis, in the magnetic armature increase and the operating temperature of the ferromagnetic hysteresis material rises again from T1 to T0. This results in an increase in the radial air gap from e1 to e0 and, consequently, a decrease in the torque developed at the output of the clutch 24. This corresponds to returning to the starting point 0 in the diagram of FIG. 3.

In summary, the clutch is characterized by an output torque which decreases in strength when the slip between the magnetic inductor and the magnetic armature increases. In other words, the winding or reeling-in torque is always greater than the braking or reeling-out torque.

In Equation (4), mentioned earlier, the ratio $CT_2/CT_1$ is now smaller than unity, this naturally reducing the difference between T(MAX) and T(MIN). As a result, the mechanical strength of power cable 14 in the reeling-in/reeling-out device 10 of FIG. 1 can be lower with a magnetic hysteresis clutch according to the present invention, than with a prior an clutch.

Given that, in the proposed clutch the transmitted torque CT decreases when the slip increases, it is found that it is possible to tolerate higher rates of slip between the magnetic inductor and the magnetic armature. This may result in the speed reducer 25 having a smaller reduction ratio and/or the motor 22 having a higher speed of rotation. A magnetic hysteresis clutch of the type shown in FIGS. 4 to 7 has many other advantages over prior art clutches.

A first advantage is that the transmission of a torque from the magnetic inductor to the magnetic armature via the radial air gap involves a much greater lever arm than for the transmission of a torque via an axial air gap, such as produced by most prior art magnetic hysteresis clutches. This means that, for the transmission of the same torque, the clutch of FIG. 4 requires a lower total magnetic induction.

A second advantage is that a radial air gap clutch, according to FIG. 4, may be designed so as to compensate for gradual reduction in the transmitted torque during operation of the clutch. This reduction in the transmitted torque can be explained by the permanent magnets of the magnetic inductor heating during a prolonged operation; this heating leading to a decrease in the strength of their magnetic field. The heating of the magnets is mainly explained by a heat transfer by radiation and convection via the air gap between the ferromagnetic hysteresis material, raised to a relatively high mean working temperature, and the permanent magnets facing it. Now, in a clutch according to FIG. 4, this gradual reduction in the transmitted torque due to the heating of the permanent magnets 66, may be compensated by profiting from the thermal expansion of the wheels 60, 61, 62, 63 which accompanies the heating of the permanent magnets 66. Indeed it is sufficient for the wheels 60, 61, 62, 63 of the magnetic inductor 58 to be constructed so that their radial expansion causes a decrease in the radial air gap 78 which is sufficient to compensate for the decrease in the strength of the magnetic field due to the heating of the permanent magnets 66. It will be noted that the radial expansion necessary for this purpose is very low, since the transmitted torque is inversely proportional to the cube of the radial extension of the air gap between the magnets 66 and the rings 80, 81, 82, 83. As the magnetic inductor wheels 60, 61, 62, 63 have a relatively high thermal inertia, the latter are not or are only very slightly affected by the temperature changes of the ferromagnetic material due to the changes of the slip. The wheels 60, 61, 62, 63 preferably consist of a material with a high thermal conductivity. Heat transfer between the magnets 66 and the peripheral ring 64 of the magnetic inductor wheels 60, 61, 62, 63 should be as good as possible. A heat conducting paste may be used to increase in blind bores 68 the thermal coupling between the magnets 66 and the magnetic inductor wheels 60, 61, 62, 63.

A third notable advantage is that the magnetic inductor composed of a plurality of wheels 60, 61, 62, 63 arranged on the output shaft 28 offers appreciable facilities as regards the designing of the clutch. Indeed, in order to increase the transmitted torque, it is sufficient to add an additional wheel to the magnetic inductor 58 and an additional ring to the magnetic armature 56. In order to reduce the transmitted torque, it is sufficient, of course, to remove a wheel from the magnetic inductor 58. Given that the heating of the ferromagnetic hysteresis material is a function of the strength of the magnetic field, it is also possible to influence the thermal expansion of the ferromagnetic rings 80, 81, 82, 83 by choosing a suitable number of inductor wheels 60, 61, 62, 63.

A fourth advantage of a clutch according to FIG. 4 resides in the large number of small magnets 66 per inductor wheel 60, 61, 62, 63. By varying the power, the polarity and the distribution of these numerous small magnets, it is possible to finely modulate the magnetic field surrounding each wheel 60, 61, 62, 63 and thereby to influence the thermal expansion of the ferromagnetic rings 80, 81, 82.

A fifth advantage of a clutch of the kind represented in FIG. 4 resides in the design of the magnetic armature in the form of rings 80, 81, 82, 83 surrounding the wheels 60, 61, 62, 63 of the magnetic inductor 58. This is because these rings 80, 81, 82, 83 are characterized by a low mass and have therefore a low thermal inertia, which guarantees a rapid variation in their operating temperature when the energy dissipated by the hysteresis effect in the ferromagnetic material varies. Their cooling is ideal, since their contact surface area with the external rotor 70 is higher than their surface area oriented towards the magnets 66. In this context it should also be noted that a radial air gap can, of course, be produced more easily and more accurately than an axial air gap between two rotating discs. In a clutch with a radial air gap between the magnetic inductor and the magnetic armature, it is consequently possible to work with a smaller air gap than in a clutch with an axial clearance between the magnetic inductor 58 and the magnetic armature 56. This results in a markedly lower magnetic field being needed to transmit the same torque.

A sixth advantage of a clutch according to FIG. 4 resides in the design of the cooling of the external rotor 70. The thermal energy produced in the tings 80, 81, 82, 83 is drained via the shortest possible path directly towards the longitudinal fins 76 equipping the external rotor 70. The rolling bearings 74 and 72 are very far from the hottest locations of the external rotor 70. In most prior art magnetic hysteresis clutches the rolling bearings are, in contrast, located in the immediate vicinity of the ferromagnetic hysteresis material and are consequently much more exposed to heating up.

A seventh advantage of a clutch according to FIG. 4 resides in the possibility to easily change the radial overlapping of the ferromagnetic rings 80, 81, 82, 83 and the magnetic inductor wheels 60, 61, 62, 63 and thereby to finely adjust the transmitted torque.

Figure 8:
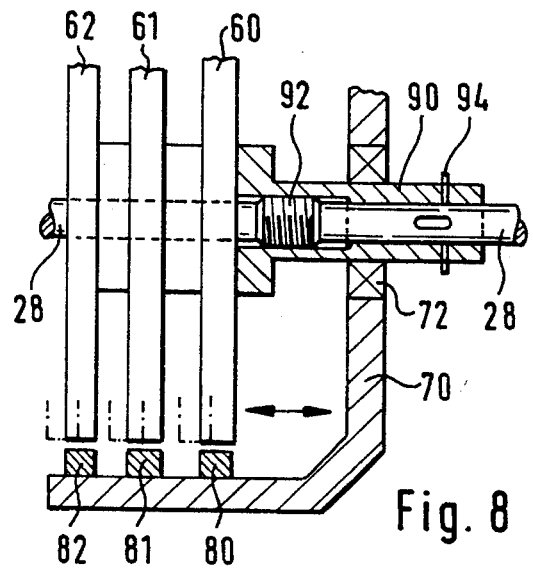
FIG. 8 is a longitudinal cross-section through a special embodiment of the magnetic hysteresis clutch of FIG. 4.

FIG. 8 shows a preferred embodiment of a clutch wherein the radial overlapping of the ferromagnetic rings 80, 81, 82, 83 and the magnetic inductor wheels 60, 61, 62, 63 may be continuously adjusted between 0% and 100%, without having to dismantle the clutch. The wheels 60, 61, 62, 63 are assembled to form a rigid inductor bloc. Shaft 28 is slidingly guided in this inductor block without being attached to the latter. The inductor bloc is rigidly connected to a sleeve 90 axially guided through the bearing 72. This sleeve 90 is screwed on a threaded portion of shaft 28. It follows that a relative rotation of sleeve 90 and shaft 28 results in an axial displacement of the inductor bloc along shaft 28. A pin 94 is used to bloc the sleeve 90 in rotation on shaft 28.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A magnetic hysteresis clutch comprising:
    a rotor supporting a ferromagnetic hysteresis material on an interior surface thereof, and a rotary magnetic inductor arranged within said rotor so as to define a radial air gap bounded on the outside by said ferromagnetic hysteresis material, said rotor being external of said magnetic inductor;
    a slip between said magnetic inductor and said ferromagnetic hysteresis material being variable; wherein
    at least one ring of ferromagnetic hysteresis material is mounted in said external rotor so as to be able to undergo a reversible thermal expansion of its internal diameter leading to an increase in said radial air gap, wherein said clutch is designed so that the heating up of said ferromagnetic material in said at least one ring which accompanies an increase of the slip, produces a reversible increase in said radial air gap which is sufficient to decrease the transmitted torque.

2. A magnetic hysteresis clutch as claimed in claim 1 wherein said ferromagnetic material is a material having a high electrical resistivity.

3. A magnetic hysteresis clutch as claimed in claim 2 wherein said ferromagnetic material is a sintered material which is based on electrically insulated metal powders.

4. A magnetic hysteresis clutch as claimed in claim 1 wherein said magnetic inductor comprises a plurality of wheels mounted on a shaft, each of said wheels being fitted with a peripheral first ring supporting a plurality of permanent magnets, and in that said ferromagnetic hysteresis material of said external rotor is distributed over a plurality of second rings separated axially from each other, each of said second rings surrounding one of said first rings of said wheels so as to define a radial air gap with the latter.

5. A magnetic hysteresis clutch as claimed in claim 6 wherein said rotor supporting said rings comprises longitudinal cooling fins.

6. A magnetic hysteresis clutch as claimed in claim 4 wherein each of said wheels supports a plurality of permanent magnets each having a pole surface area from 50–100 mm$^2$.

7. A magnetic hysteresis clutch as claimed in claim 4 wherein said clutch is constructed so that heating up, or respectively cooling down, of its permanent magnets in continuous operation is accompanied by parallel heating up, and respectively, parallel cooling down, of said wheels supporting the permanent magnets, so that the variations in the diameters of said wheels which results from thermal change automatically compensate, by a reduction, or respectively an increase, in said radial air gap, for a decrease, or respectively an increase, in said magnetic field produced.

8. A magnetic hysteresis clutch as claimed in claim 1 wherein at least one of said at least one ring of ferromagnetic hysteresis material has an external cylindrical surface;
    and said external rotor includes a corresponding internal cylindrical surface; and
    said external cylindrical surface and internal cylindrical surface being bonded adhesively and elastically by an elastic bonding material.

9. A magnetic hysteresis clutch as claimed in claim 4 wherein said radial air gap has a radial thickness of the order of less than one millimeter.

10. A reeling-in/reeling-out device comprising:
    a drive motor and a reeling-in/reeling-out drum having a magnetic hysteresis clutch according to claim 1, wherein;
    said external rotor is coupled to said drive motor; and
    said magnetic inductor is coupled to said reeling-in/reeling-out drum.

11. A reeling-in/reeling-out device as claimed in claim 10 wherein a speed reducer is connected between said magnetic inductor and said reeling-in/reeling-out drum.

* * * * *